United States Patent
Lin et al.

(10) Patent No.: US 7,482,955 B2
(45) Date of Patent: Jan. 27, 2009

(54) STRING MATCHING SYSTEM AND METHOD USING BLOOM FILTERS TO ACHIEVE SUB-LINEAR COMPUTATION TIME

(76) Inventors: Po-Ching Lin, 4F., No.58, Alley 37, Lane 66, Dongyuan St., Wanhua District, Taipei City 108 (TW); Ying-Dar Lin, No.1001, Dasyue Rd., East District, Hsinchu City 300 (TW); Yi-Jun Zheng, No.1001, Dasyue Rd., East District, Hsinchu City 300 (TW); Yuan-Cheng Lai, No.43, Sec. 4, Keelung Rd., Da-an District, Taipei City 106 (TW)

( * ) Notice: Subject to any disclaimer, the term of this patent is extended or adjusted under 35 U.S.C. 154(b) by 0 days.

(21) Appl. No.: 11/756,453

(22) Filed: May 31, 2007

(65) Prior Publication Data
US 2008/0111718 A1    May 15, 2008

(30) Foreign Application Priority Data
Nov. 15, 2006  (TW) .............................. 95142250 A

(51) Int. Cl.
*H03M 7/00*   (2006.01)
(52) U.S. Cl. ........................ 341/95; 341/50; 341/106; 341/107; 707/3; 707/5; 707/6
(58) Field of Classification Search ........... 341/50–106; 702/1–6
See application file for complete search history.

(56) References Cited

U.S. PATENT DOCUMENTS

| | | | | |
|---|---|---|---|---|
| 5,778,361 A * | 7/1998 | Nanjo et al. | | 707/5 |
| 6,721,728 B2 * | 4/2004 | McGreevy | | 707/3 |
| 6,741,981 B2 * | 5/2004 | McGreevy | | 707/3 |
| 6,823,333 B2 * | 11/2004 | McGreevy | | 707/4 |
| 2004/0059725 A1 * | 3/2004 | Sharangpani et al. | | 707/3 |
| 2004/0215593 A1 * | 10/2004 | Sharangpani et al. | | 707/1 |
| 2005/0160304 A1 * | 7/2005 | Kido | | 714/1 |
| 2006/0098899 A1 * | 5/2006 | King et al. | | 382/305 |
| 2007/0179935 A1 * | 8/2007 | Lee et al. | | 707/3 |
| 2007/0260602 A1 * | 11/2007 | Taylor | | 707/6 |
| 2008/0077570 A1 * | 3/2008 | Tang et al. | | 707/5 |

\* cited by examiner

*Primary Examiner*—Linh V Nguyen
(74) *Attorney, Agent, or Firm*—Lapus Greiner Lai Corsini, LLC; Theodore Lapus; Edwin Greiner

(57) ABSTRACT

A string matching system includes a text string, a plurality of patterns, an m-byte search window and a plurality of Bloom filters, wherein the m-byte search window stands for an m-byte sub-string in the text string under inspection. Every Bloom filter comprises sub-strings of a plurality of patterns. These Bloom filters are queried for membership of the rightmost block in the search window to determine the shift length. The acceleration efficiency of matching many bytes can be achieved simultaneously by shifting the search window for many bytes. Meanwhile, the patterns are stored into an embedded memory through a memory-efficient mechanism—the Bloom filter.

11 Claims, 5 Drawing Sheets

$P_1$=abcdefgh
$P_2$=ijklmnop
$P_3$=zyxwvuts
$G_0$={efgh,mnop,vuts}
$G_1$={defg,lmno,wvut}
$G_2$={cdef,klmn,xwvu}
$G_3$={bcde,jklm,yxwv}
$G_4$={abcd,ijkl,zyxw}
$G_5$={abc,ijk,zyx}
$G_6$={ab,ij,zy}
$G_7$={a,i,z}

STRING MATCHING SYSTEM AND METHOD USING BLOOM FILTERS TO ACHIEVE SUB-LINEAR COMPUTATION TIME

BACKGROUND OF INVENTION

1. Field of the Invention

The present invention generally relates to a string matching system and its method, and more particularly to the system and the method, which employ a plurality of Bloom filters for matching the strings and decide the shift distance of the search window to achieve the goal of accelerating hardware (HW) within sub-linear computation time.

2. Description of Related Art

While more and more people gain access to the Internet, there is ever-growing information flowing across the network. However, potential network intrusion and attack pose negative influences upon computer and network systems. For example, a variety of servers or even PCs (personal computers) are vulnerable to viruses.

In recent years, many safety-related information systems, such as a Network Intrusion Detection System (NIDS) and an antivirus system have become an important safety-related network technology, in which the matching efficiency of network packet content is decisive to the system performance. In the event of slow matching speed on strings, the network-dependent tasks may not be performed on time, so the failures of detecting network intrusion or viruses increases to a great extent. A sub-linear time algorithm can skip characters not in a match during scanning for signatures of intrusions and viruses. Therefore, it can be very efficient for signature matching. FIG. 1 depicts the flow process of a typical sub-linear time string matching method, of which the matching steps include:

Step S11: Start;

Step S12: Build up a block containing the last bytes in the search window, and look it up in the shift distance table to obtain a shift length N;

Step S13: Check if shift length is 0; if yes, perform Step S15, otherwise, perform Step S14;

Step S14: Shift forward the search window for the distance implied from the table lookup, and return to Step S12;

Step S15: Compare the hash value table that contains the pattern set;

Step S16: Check if a string in the table is the same; if yes, perform Step S17, otherwise, perform Step S18;

Step S17: Set the successful matching flag as true;

Step S18: Shift forward 1 byte for the sliding window, and return to Step S12; and Step S19: Output.

The shift length of the search window is generally decided by means of looking up the shift distance table. This requires a large memory space to store the shift length for every block. When a small block is used to reduce the table space, frequent verification may be required, thus leading to slower matching speed and poorer matching efficiency. To overcome the aforementioned problems of the prior art, it would be an improvement if the art provides a better structure that can significantly improve the efficacy.

To this end, the inventor has provided the present invention of practicability after deliberate design and evaluation based on years of experience in the production, development and design of related products.

SUMMARY OF THE INVENTION

For this reason, the purpose of the present invention is to provide a string matching system and its method, which employ a plurality of Bloom filters to match the strings and decide the shift length of the search window to achieve the goal of accelerating hardware (HW).

For this purpose, the string matching system of the present invention comprises a text string, a plurality of patterns, an m-byte search window and a plurality of Bloom filters. The m-byte search window stands for an m-byte sub-string in the text string under inspection. Every Bloom filter comprises sub-strings of a plurality of patterns. These Bloom filters are queried for membership of the blocks from the rightmost one in the search window to determine the shift length.

According to the string matching system and method of the present invention, a heuristic algorithm is used to match several bytes simultaneously by skipping over unsuccessful bytes without increasing the complexity of hardware. The patterns are stored into an embedded memory through a memory-efficient mechanism—the Bloom filter, thereby saving the memory space without the need of setting up the shift distance table.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
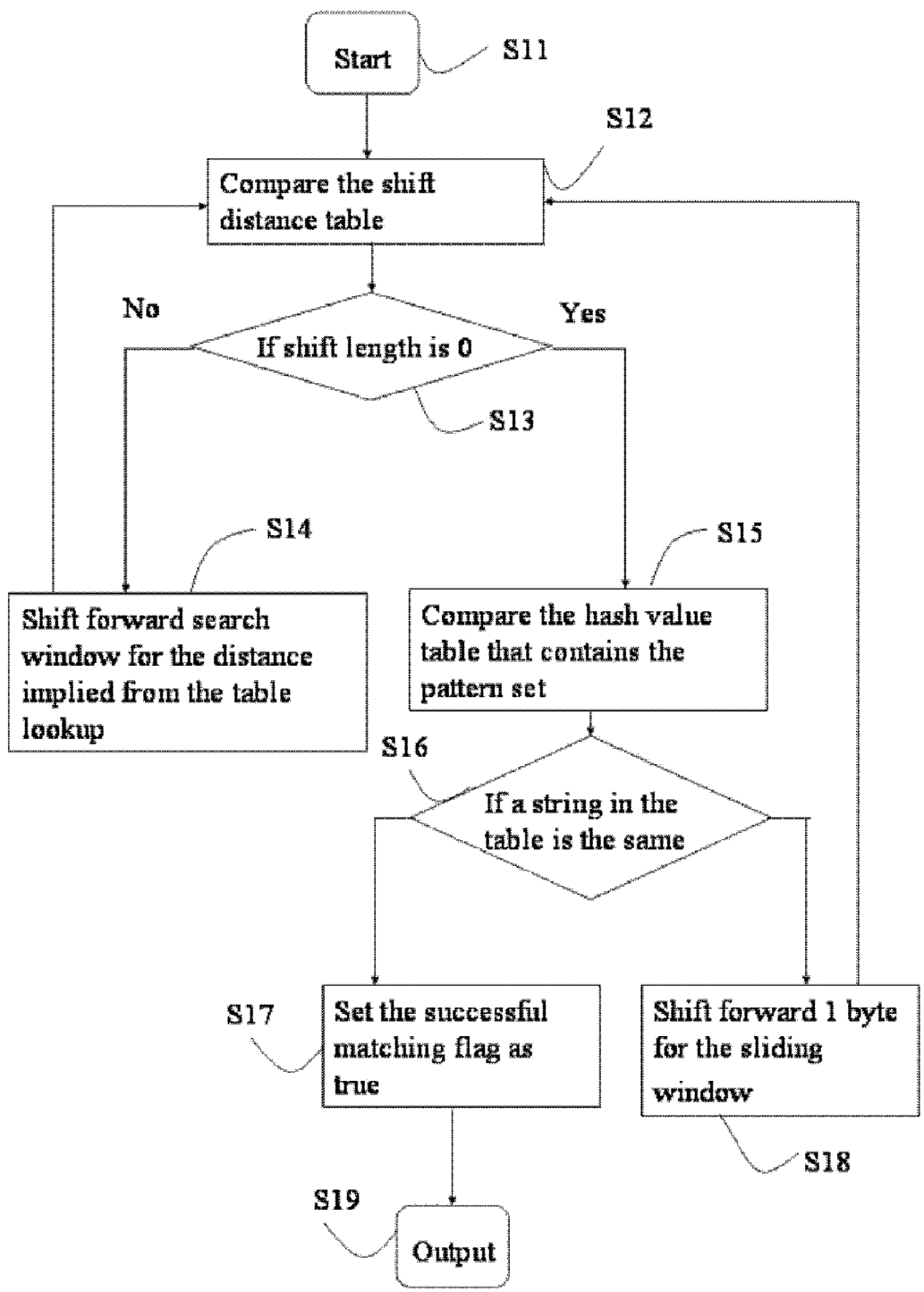
FIG. 1 shows a flow process of a conventional sub-linear time string matching method.
Figure 2:
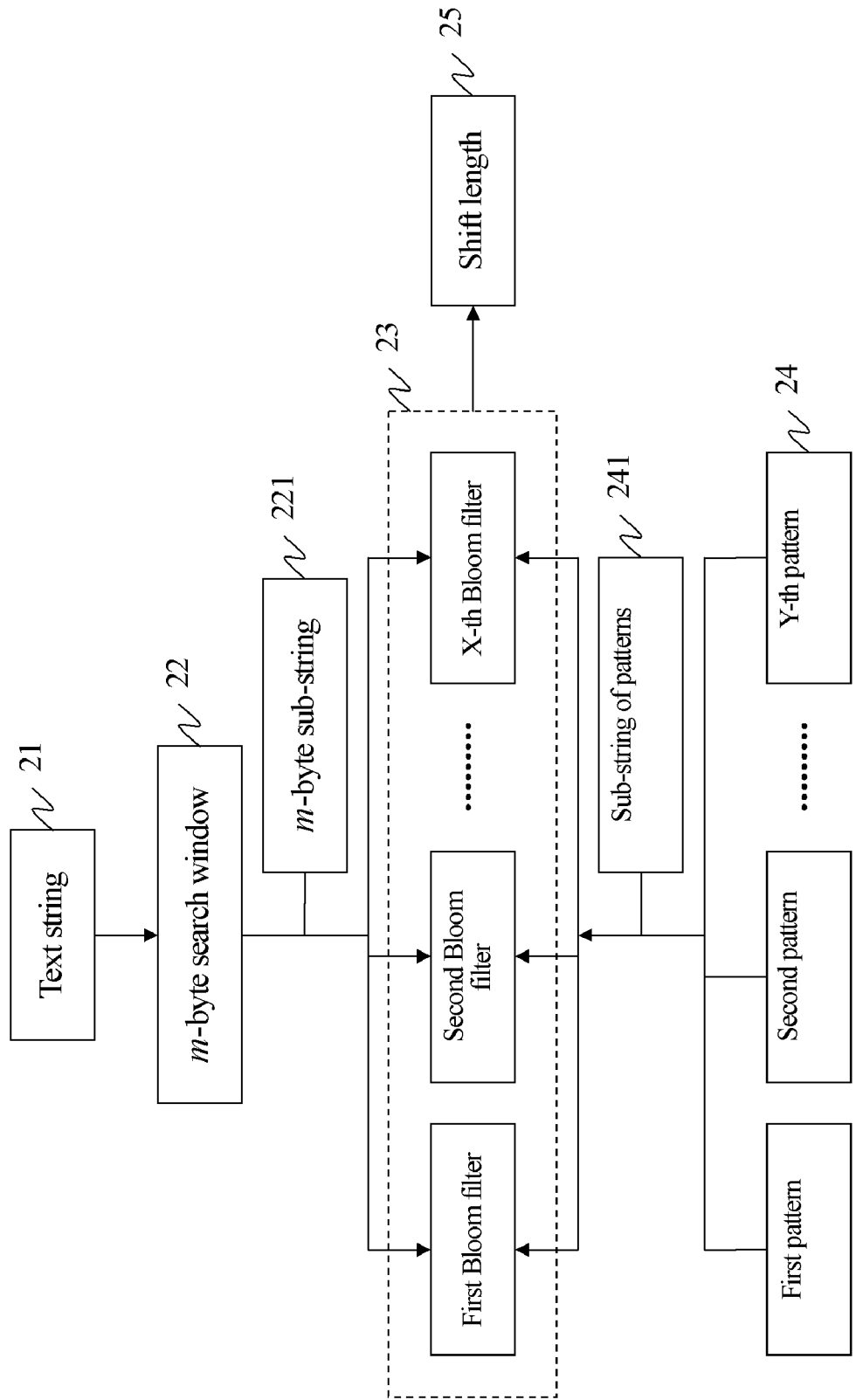
FIG. 2 shows a block diagram of the string matching system of the present invention.

FIG. 2 depicts a block diagram of a string matching system of the present invention, wherein the system comprises a text string 21, a plurality of patterns 24, an m-byte search window 22 and a plurality of Bloom filters 23. The m-byte search window 22 stands for an m-byte sub-string 221 in the text string 21 under inspection. Every Bloom filter 23 comprises sub-strings 241 of a plurality of patterns, wherein the Bloom filters are required for membership of a rightmost block in the m-byte search window 22 to initially determine a shift length 25.

The length of the m-byte search window is equal to the shortest length of the pattern. Every pattern is divided into M−Q+1 sub-strings based on length Q. The sub-strings are grouped according to positions of the sub-strings in the pattern in order to be respectively stored in the Bloom filter. In addition, every pattern is grouped into a plurality of sub-strings according to the prefix of preceding i words, wherein i=1, ... (Q−1), and are separately stored in the Bloom filter.

Moreover, the string matching system comprises a priority setting module. When the Bloom filter generates two or more shift lengths, the priority setting module is used to determine the shift length and output the shorter shift length on a priority.

Figure 3:
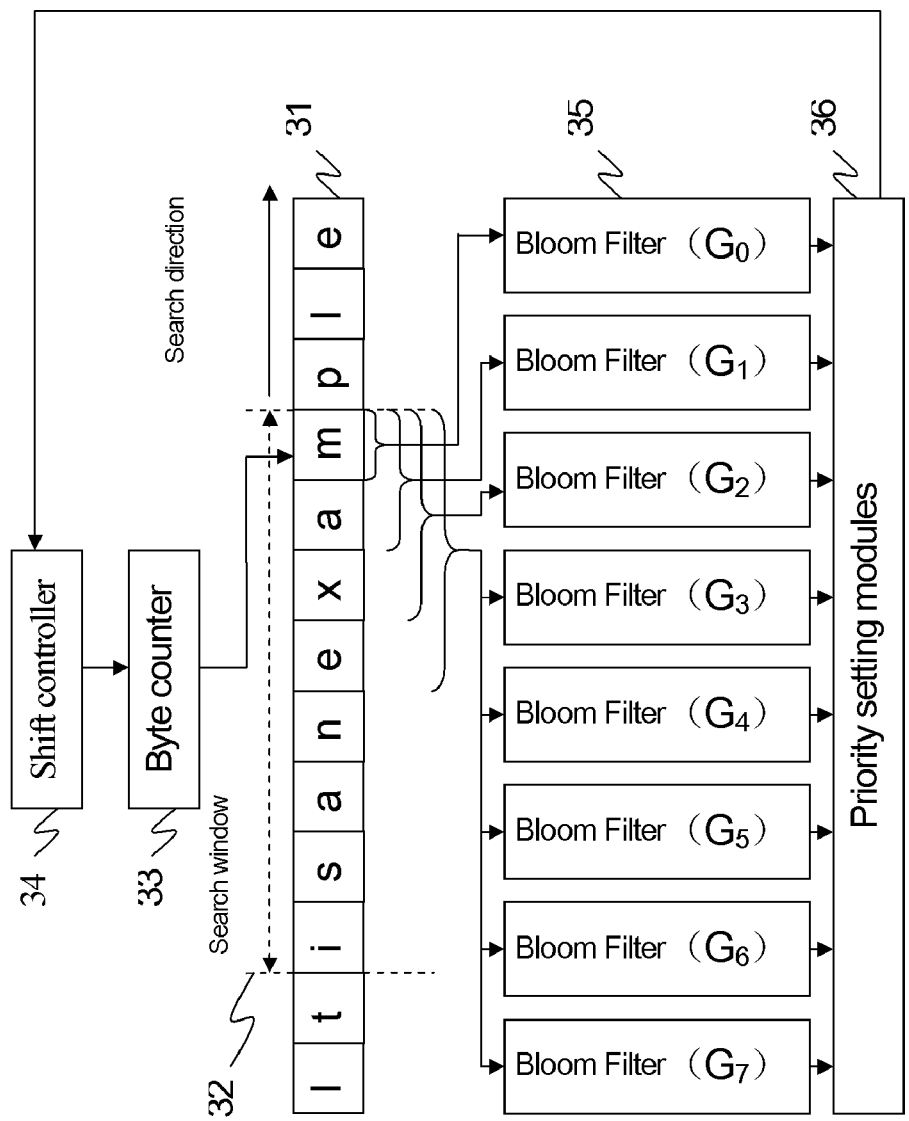
FIG. 3 shows a view of a preferred embodiment of a string matching system of the present invention.

FIG. 3 depicts a view of a preferred embodiment of a string matching system of the present invention. $P_1$, $P_2$, $P_3$ are patterns. The texts to be searched are stored separately in a text buffer area 31, where a search window 32 is shifted to compare the bytes in the window to determine whether or not patterns appear in the pattern set. If the string length in the pattern set is not the same, and it supposes the minimum length is M, only the pattern with prefix length M is considered. And, the length of the search window 32 is also set as M, the shift position of the search window is controlled through the byte counter 33, and the suffix in the preceding buffer area will become the prefix of next buffer area for repetitive matching to prevent some patterns in the patterns spanning two buffer areas against matching. In common case, the bytes in the search window are not matched one by one, so possibly bytes which are unsuccessfully matched shall be skipped over, and the search window is shifted forward for several bytes.

To determine the shift distance of the search window 32 conveniently using heuristic algorithm, every pattern in the pattern set is considered to be composed of M−Q+1 blocks, wherein Q is the block length. In the preferred embodiment, Q=4, $P_1$=abcdefgh is deemed as five blocks: abcd-bcde-cdef-defg-efgh, and the like. Every block is grouped according to its position in the pattern, and then stored separately in the Bloom Filter 35. In addition, the prefixes of preceding i words in every pattern are grouped, i=1, . . . ,(Q−1), and separately stored in respective Bloom Filter 35. In the preferred embodiment, the prefixes of blocks and blocks in the pattern set $\{P_1,P_2,P_3\}$ are grouped into $G_0$-$G_7$ as shown in the figure.

The matching process begins with searching the rightmost block of the length Q in the search window 32, and simultaneously querying the Bloom Filter 35 to determine whether or not the rightmost block appears from $G_0$ to $G_4$, and whether or not the suffix of this block is located among $G_5$ to $G_7$. If the Bloom Filter 35 representing $G_i$ is successfully queried (possibly successful querying of more than one $G_i$), the suffix of the block or the pattern possibly exists in $G_i$. If i>0, the shift distance of the search window 32 is the minimum value of i; if $G_i$ is unsuccessfully queried, the shift distance of the search window 32 is m-bytes; if i=0, the matching process in the next phase is performed. The aforementioned heuristic is summarized below:

the shift distance of the search window =
$$\begin{cases} \min\{i | \text{successful querying of } G_i\}, \text{ the minimum value of } i > 0; \\ m, \text{ unsuccessful querying of any } G_i; \\ \text{comparing in the next phase, the minimum value of } i = 0; \end{cases}$$

Even if the Bloom Filter 35 misjudges in this system, the heuristic only enables the search window to have a smaller shift distance, but no intended pattern is missed. In the embodiment, the rightmost "exam" block in the search window does not exist in any block of the patterns, and its suffix is not the prefix of any pattern either. Thus, the search window could be freely shifted 8 bytes without missing any pattern.

After querying with heuristic, the query result of the Bloom Filter 35 is sent to the priority setting module 36 to find out the minimum value, and then sent to the shift controller 34 to compute a new value of the byte counter 33, equivalent to shifting the search window 32 to the next position. Therefore, several bytes can be compared simultaneously since several bytes are skipped one time in the search window 32. If the search window 32 exceeds the scope of the text buffer area 31, the next batch of texts is loaded to the buffer area for continuously searching. The searching could end, where applicable, if one or more patterns are found in the text (or no any pattern is matched).

If the minimum value of i for successful querying of $G_i$ is 0, the next matching step is performed. The reciprocal $2^{nd}$ and $3^{rd}$ blocks, and so on in the search window are compared sequentially from right to left, while the positions of the Bloom Filters 35 in $G_i$ are queried and found out. The possible matching results are listed below:

(1) If the reciprocal i-th block from right to left successfully queries the Bloom Filter representing $G_{i-1}$, the content in the search window 32 may still be a portion of a certain pattern, and then the matching process continues until all blocks in the search window 32 are completely matched for successful querying of the Bloom Filters. In such case, the validation process is performed.

(2) If the reciprocal i-th block from right to left fails to query the Bloom Filter representing $G_{i-1}$, the content of the search window 32 may not exist in any pattern, so no continuous matching is required. In such case, check which Bloom Filter 35 representing $G_j$ is successfully queried, wherein j>i−1. In the case of successful querying two more Bloom Filters 35, the shift distance of the search window 32 is j−i+1, otherwise m−i+1.

In the case of successful querying Bloom Filter by every block in the search window 32, the words in the window may present a portion of or whole patterns. In such case, the validation process is performed, rather than validation immediately after successful querying the rightmost block. Therefore, the frequency of validation is reduced and worse situation induced by external attackers is decreased, so that the system may not take much time for verification.

Through a non-blocking verification interface, the words are verified by a verification module. Meanwhile the search window is shifted with a byte to search continuously without waiting, such that the search time may not be delayed by the verification procedure.

Figure 4:
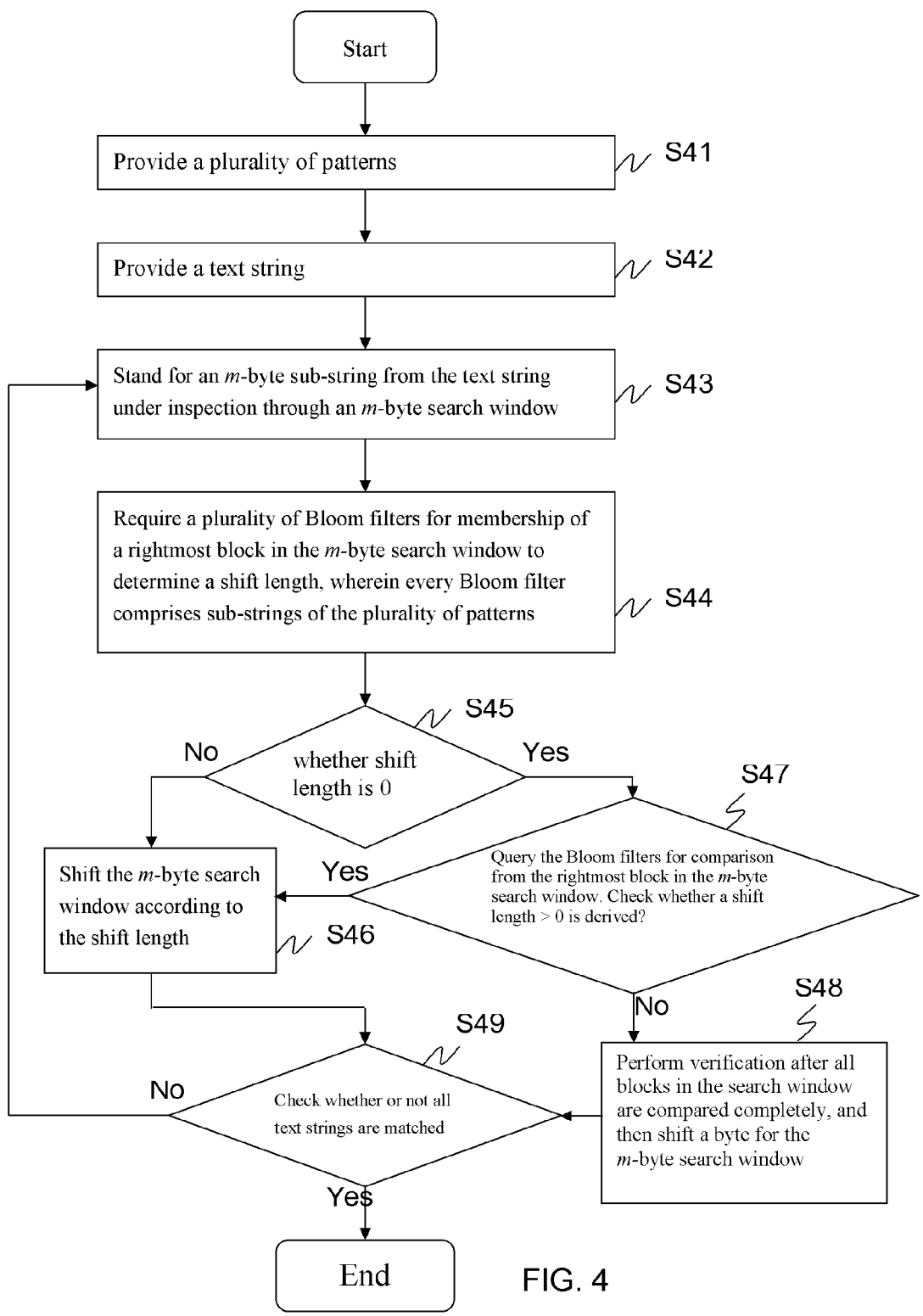
FIG. 4 shows a flow process of a string matching method of the present invention.

FIG. 4 depicts a flow process of a string matching method of the present invention:

Step S41: Provide a plurality of patterns;

Step S42: Provide a text string;

Step S43: Stand for an m-byte sub-string from the text string under inspection through an m-byte search window;

Step S44: Require a plurality of Bloom filters for membership of a rightmost block in the m-byte search window to determine a shift length, wherein every Bloom filter comprises sub-strings of the plurality of patterns;

Step S45: Determine whether or not shift length is 0, if yes, perform Step S47, otherwise, perform Step S46;

Step S46: Shift the m-byte search window according to the shift length;

Step S47: Sequentially query the Bloom filters for comparison from the rightmost block in the m-byte search window, and determine whether or not the block with shift length>0 is found, if yes, perform Step S46, otherwise, perform Step S48;

Step S48: Perform verification after all blocks in the search window are compared completely, and then a byte for the m-byte search window is shifted; and Step S49: Check whether or not all text strings are matched completely, if yes, finish the matching; otherwise, repeat Step S43.

The length of the m-byte search window is equal to the shortest length of the pattern. Every pattern is divided into M−Q+1 sub-strings based on length Q. The sub-strings are grouped according to positions of the sub-strings in the pattern in order to be respectively stored in the Bloom filter. In addition, every pattern is grouped into a plurality of sub-strings according to the prefix of preceding i words, wherein i=1, . . . , (Q−1), and are separately stored in the Bloom filter. Moreover, the string matching system comprises a priority setting module. When the Bloom filter generates two or more shift lengths, the priority setting module is used to determine the shift length and output the shorter shift length on a priority.

Figure 5:
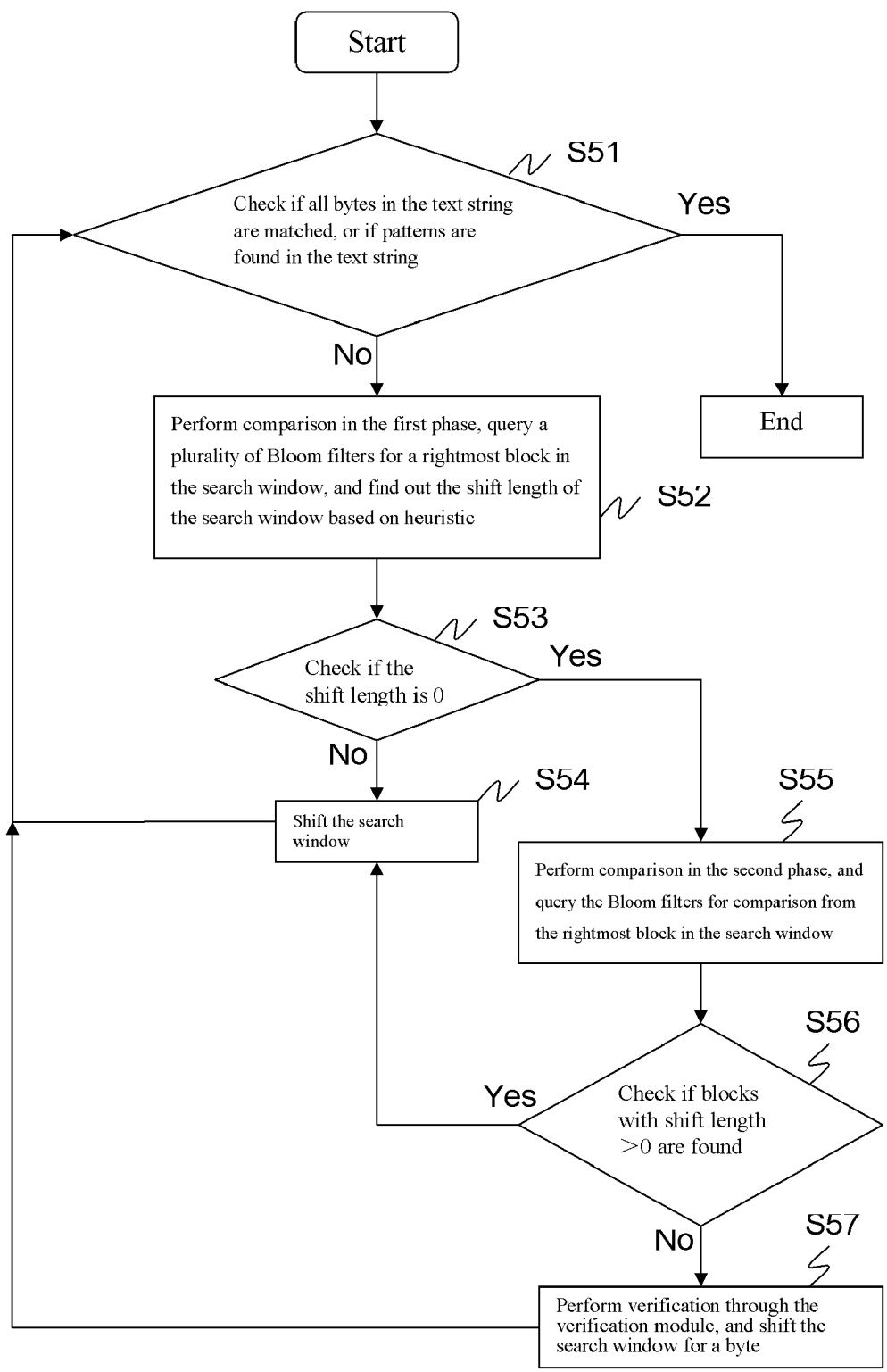
FIG. 5 shows a flow process of a preferred embodiment of a string matching method of the present invention.

FIG. 5 depicts the flow process of a preferred embodiment of a string matching method of the present invention:

Step S51: Check whether or not all bytes in the text string are matched, or whether or not patterns are found in the text string; if yes, finish the matching, otherwise, perform Step S52;

Step S52: Perform comparison in the first phase, query a plurality of Bloom filters for a rightmost block in the search window, and find out the shift length of the search window based on heuristic;

Step S53: Check whether or not the shift length is 0; if yes, perform Step S55, otherwise, perform Step S54;

Step S54: Shift the search window, and return to Step S51;

Step S55: Perform comparison in the second phase, and sequentially query the Bloom filters for comparison from the rightmost block in the search window;

Step S56: Check whether or not blocks with shift length>0 are found; if yes, perform Step S54, otherwise, perform Step S57; and Step S57: Perform verification through the verification module, and shift the search window for a byte, and return to Step S51.

Although the invention has been explained in relation to its preferred embodiment, it is to be understood that many other possible modifications and variations can be made without departing from the spirit and scope of the invention as hereinafter claimed.

What is claimed is:

1. A string matching system, comprising:
   a text string;
   a plurality of patterns;
   an m-byte search window standing for an m-byte sub-string in the text string under inspection;
   a plurality of Bloom filters, each of the Bloom filter comprising sub-strings of the plurality of patterns; wherein the Bloom filters are required for membership of a rightmost block in the m-byte search window to determine a shift length; and
   a priority setting module, wherein when the Bloom filter generates two or more shift lengths, the priority setting module is used to determine the shift length and output the shorter shift length on a priority.

2. The string matching system defined in claim 1, wherein the length of the m-byte search window is equal to the shortest length of the pattern.

3. The string matching system defined in claim 1, wherein if the shift length is N, the m-byte search window stands for a next m-byte sub-string in the text string under inspection by shifting forward N bytes.

4. The string matching system defined in claim 1, wherein every said pattern is divided into M−Q+1 sub-strings based on length Q, and the sub-strings are grouped according to positions of the sub-strings in the pattern in order to be separately stored in the Bloom filter.

5. The string matching system defined in claim 4, wherein every said pattern is grouped into a plurality of sub-strings according to the prefix of preceding i words, wherein i=1 . . . , (Q−1), and are stored separately in the Bloom filters.

6. A string matching method, comprising:
   (a) providing a plurality of patterns;
   (b) providing a text string;
   (c) standing for an m-byte sub-string from the text string under inspection through an m-byte search window;
   (d) requiring a plurality of Bloom filters for membership of the rightmost block in the m-byte search window to determine a shift length, wherein every Bloom filter comprises sub-strings of the plurality of patterns; and
   (e) if the shift length is 0, the Bloom filters are queried for comparison of the blocks from the rightmost one backward in the m-byte search window; if the shift length is not greater than 0, verification is implemented after finishing comparison, and a byte for the m-byte search window is shifted, and if the shift length is not 0, or greater than 0, the m-byte search window is shifted according to the shift length; and
   (f) repeating Step (c) to Step (e) until the text string is matched completely.

7. The method defined in claim 6, wherein the length of the m-byte search window is equal to the shortest length of the pattern.

8. The method defined in claim 6, wherein if the shift length is N, the m-byte search window stands for a next m-byte sub-string in the text string under inspection by shifting forward N bytes.

9. The method defined in claim 6, wherein every said pattern is divided into M−Q+1 sub-strings based on length Q, and the sub-strings are grouped according to positions of the sub-strings in the pattern in order to be respectively stored in the Bloom filter.

10. The method defined in claim 9, wherein every said pattern is grouped into a plurality of sub-strings according to the prefix of preceding i words, wherein i=1, . . . , (Q−1), and are stored separately in the Bloom filter.

11. The method defined in claim 6, further comprising a step of providing a priority setting module, wherein when the Bloom filter generates two or more shift lengths, the priority setting module is used to determine the shift length and output the shorter shift length on a priority.

* * * * *